US011593029B1

(12) United States Patent
Dhuse et al.

(10) Patent No.: US 11,593,029 B1
(45) **Date of Patent: *Feb. 28, 2023**

(54) IDENTIFYING A PARENT EVENT ASSOCIATED WITH CHILD ERROR STATES

(71) Applicant: Pure Storage, Inc., Mountain View, CA (US)

(72) Inventors: Greg R. Dhuse, Chicago, IL (US); Yogesh R. Vedpathak, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/236,144

(22) Filed: Apr. 21, 2021

Related U.S. Application Data

(63) Continuation of application No. 16/148,012, filed on Oct. 1, 2018, now Pat. No. 11,016,702, which is a (Continued)

(51) Int. Cl.
*G06F 16/45* (2019.01)
*G06F 3/06* (2006.01)

(Continued)

(52) U.S. Cl.
CPC .......... *G06F 3/0659* (2013.01); *G06F 3/0604* (2013.01); *G06F 3/067* (2013.01);

(Continued)

(58) Field of Classification Search
CPC .. G06F 16/953; G06F 16/957; G06F 16/9027; G06F 16/2357; G06F 16/2474; G06F 16/284; G06F 16/1734
See application file for complete search history.

(56) References Cited

U.S. PATENT DOCUMENTS 4,092,732 A 5/1978 Ouchi
5,454,101 A 9/1995 Mackay (Continued)

FOREIGN PATENT DOCUMENTS

WO 2011030164 A1 3/2011

OTHER PUBLICATIONS

Agrawal, Nitin, et al. "A five-year study of file-system metadata." ACM Transactions on Storage (TOS) 3.3 (2007): 9.

(Continued)

*Primary Examiner* — Baoquoc N To

(74) *Attorney, Agent, or Firm* — Garlick & Markison; Edward J. Marshall

(57) ABSTRACT

Event records from multiple computing devices are received at a managing unit. Individual event records include an event identifier field including an event identifier identifying a first event associated with a particular computing device, a parent event identifier field identifying a parent event that initialized the first event, and an entity identifier field including an entity identifier identifying the particular computing device. The managing unit generates log records associated with event identifiers included in the event records. The log records include state fields indicating a state of a particular event associated with a particular event identifier. Based on a correlation of the event and log records, the managing unit determines at least two computing devices associated with events resulting in an error state, and identifies parent events that initialized the events with errors. The managing unit generates a report linking the parent events to the events having an error state.

20 Claims, 10 Drawing Sheets

Related U.S. Application Data continuation-in-part of application No. 15/716,169, filed on Sep. 26, 2017, now Pat. No. 10,678,619, which is a continuation-in-part of application No. 13/547,769, filed on Jul. 12, 2012, now Pat. No. 9,852,017.

(60) Provisional application No. 61/512,122, filed on Jul. 27, 2011.

(51) Int. Cl.

*G06F 11/10* (2006.01)
*G06F 11/07* (2006.01)
*G06F 11/30* (2006.01)
*G06F 11/34* (2006.01)
*G06F 11/32* (2006.01)

(52) U.S. Cl.

CPC .......... *G06F 3/0619* (2013.01); *G06F 3/0653* (2013.01); *G06F 11/079* (2013.01); *G06F 11/0769* (2013.01); *G06F 11/0778* (2013.01); *G06F 11/1076* (2013.01); *G06F 11/3006* (2013.01); *G06F 11/3034* (2013.01); *G06F 11/3072* (2013.01); *G06F 11/3086* (2013.01); *G06F 11/3419* (2013.01); *G06F 11/3476* (2013.01); *G06F 11/1092* (2013.01); *G06F 11/321* (2013.01); *G06F 11/3485* (2013.01)

(56) References Cited

U.S. PATENT DOCUMENTS 5,485,474 A 1/1996 Rabin
5,774,643 A 6/1998 Lubbers
5,794,252 A 8/1998 Bailey et al.
5,802,364 A 9/1998 Senator
5,809,285 A 9/1998 Hilland
5,890,156 A 3/1999 Rekieta
5,948,110 A 9/1999 Hitz
5,987,622 A 11/1999 Lo Verso
5,991,414 A 11/1999 Garay
6,012,159 A 1/2000 Fischer
6,016,553 A * 1/2000 Schneider .......... G06F 11/1471 714/21
6,047,353 A 4/2000 Vishlitzky et al.
6,058,454 A 5/2000 Gerlach
6,128,277 A 10/2000 Bruck
6,175,571 B1 1/2001 Haddock
6,192,472 B1 2/2001 Garay
6,199,178 B1 * 3/2001 Schneider .......... G06F 11/1469 714/21
6,240,527 B1 * 5/2001 Schneider .......... G06F 11/1469 714/21
6,256,688 B1 7/2001 Suetaka
6,272,658 B1 8/2001 Steele
6,301,604 B1 10/2001 Nojima
6,356,949 B1 3/2002 Katsandres
6,366,995 B1 4/2002 Vilkov
6,374,336 B1 4/2002 Peters
6,415,373 B1 7/2002 Peters
6,418,539 B1 7/2002 Walker
6,449,688 B1 9/2002 Peters
6,507,852 B1 * 1/2003 Dempsey ............ G06F 16/2358
6,567,948 B2 5/2003 Steele
6,571,282 B1 5/2003 Bowman-Amuah
6,609,223 B1 8/2003 Wolfgang
6,718,361 B1 4/2004 Basani
6,760,808 B2 7/2004 Peters
6,785,768 B2 8/2004 Peters
6,785,783 B2 8/2004 Buckland
6,826,711 B2 11/2004 Moulton
6,879,596 B1 4/2005 Dooply
7,003,688 B1 2/2006 Pittelkow
7,024,451 B2 4/2006 Jorgenson
7,024,609 B2 4/2006 Wolfgang
7,080,101 B1 7/2006 Watson
7,103,824 B2 9/2006 Halford
7,103,915 B2 9/2006 Redlich
7,111,115 B2 9/2006 Peters
7,140,044 B2 11/2006 Redlich
7,146,644 B2 12/2006 Redlich
7,171,493 B2 1/2007 Shu
7,222,133 B1 5/2007 Raipurkar
7,240,236 B2 7/2007 Cutts
7,272,613 B2 9/2007 Sim
7,330,997 B1 2/2008 Odom
7,516,209 B2 4/2009 Raghuraman
7,627,617 B2 12/2009 Kavuri et al.
7,636,724 B2 12/2009 De La Torre
7,681,105 B1 3/2010 Sim-Tang
7,685,269 B1 3/2010 Thrasher
8,024,712 B1 9/2011 Korolev et al.
8,516,343 B2 8/2013 Flynn et al.
2002/0062422 A1 5/2002 Butterworth
2002/0166079 A1 11/2002 Ulrich
2003/0018927 A1 1/2003 Gadir
2003/0037261 A1 2/2003 Meffert
2003/0065617 A1 4/2003 Watkins
2003/0084020 A1 5/2003 Shu
2003/0212903 A1 11/2003 Porras
2004/0024963 A1 2/2004 Talagala
2004/0122917 A1 6/2004 Menon
2004/0215998 A1 10/2004 Buxton
2004/0228493 A1 11/2004 Ma
2004/0243699 A1 12/2004 Koclanes
2005/0100022 A1 5/2005 Ramprashad
2005/0114594 A1 5/2005 Corbett
2005/0125593 A1 6/2005 Karpoff
2005/0131993 A1 6/2005 Fatula, Jr.
2005/0132070 A1 6/2005 Redlich
2005/0144382 A1 6/2005 Schmisseur
2005/0229069 A1 10/2005 Hassner
2005/0278476 A1 12/2005 Teske
2006/0047907 A1 3/2006 Shiga
2006/0136448 A1 6/2006 Cialini
2006/0156059 A1 7/2006 Kitamura
2006/0161805 A1 7/2006 Tseng
2006/0224603 A1 10/2006 Correll, Jr.
2006/0236053 A1 10/2006 Shiga et al.
2007/0079081 A1 4/2007 Gladwin
2007/0079082 A1 4/2007 Gladwin
2007/0079083 A1 4/2007 Gladwin
2007/0083724 A1 4/2007 Kitamura
2007/0088970 A1 4/2007 Buxton
2007/0174192 A1 7/2007 Gladwin
2007/0192478 A1 8/2007 Louie
2007/0214285 A1 9/2007 Au
2007/0234110 A1 10/2007 Soran
2007/0283167 A1 12/2007 Venters, III
2007/0294565 A1 12/2007 Johnston
2008/0071793 A1 * 3/2008 Cohen ..................... H04L 41/22
2008/0162592 A1 7/2008 Huang et al.
2009/0094245 A1 4/2009 Kerns
2009/0094251 A1 4/2009 Gladwin
2009/0094318 A1 4/2009 Gladwin
2009/0164979 A1 6/2009 Fischer
2009/0276566 A1 11/2009 Coatney et al.
2010/0023524 A1 1/2010 Gladwin
2010/0058313 A1 3/2010 Hansmann
2010/0229112 A1 9/2010 Ergan
2010/0235434 A1 * 9/2010 Henders ................ G06F 16/275 709/203
2010/0332818 A1 12/2010 Prahlad
2011/0026842 A1 2/2011 Cilfone et al.
2011/0078206 A1 3/2011 Chen
2011/0107103 A1 5/2011 Dehaan et al.
2011/0161680 A1 5/2011 Grube
2012/0047214 A1 2/2012 Daly
2012/0266011 A1 10/2012 Storer et al.

(56) References Cited

U.S. PATENT DOCUMENTS

2013/0097367 A1 4/2013 Flynn et al.
2014/0134996 A1 5/2014 Barclay

OTHER PUBLICATIONS

Chung; An Automatic Data Segmentation Method for 3D Measured Data Points; National Taiwan University; pp. 1-8; 1998.
Douglis, Fred, and John Ousterhout. "Log-structured file system." COMPCON Spring'89. Thirty-Fourth IEEE Computer Society International Conference: Intellectual Leverage, Digest of Papers IEEE, 1989.
European Patent Office; Extended Search Report; EP Application No. 12817413.3; dated Feb. 24, 2015; 6 pgs.
Harrison; Lightweight Directory Access Protocol (LDAP): Authentication Methods and Security Mechanisms; IETF Network Working Group; RFC 4513; Jun. 2006; pp. 1-32.
International Search Report and Written Opinion; International Application No. PCT/US12/46544; dated Oct. 16, 2012; 7 pgs.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; Ie Ii Network Working Group; RFC 4517; Jun. 2006; pp. 1-50.
Muhammad, Yousaf, "Evaluation and Implementation of Distributed NoSQL Database for MMO Gaming Environment," Oct. 2011, http://www.diva-portal.org/smash/get/diva2:44721 0/FULL TEXT01.pdf.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Resch, Jason K., Plank, James S., "AONT-RS: Blending Security and Performance in Dispersed Storage Systems;" Feb. 2011, http://web.eecs.utk.edu/-plank!plank!papers/FAST-2011.pdf.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; Ie If Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Tate, Jon, et al. Introduction to storage area networks. IBM Corporation, International Technical Support Organization, 2005.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner distributed, or dispersed, storage network (DSN) 10

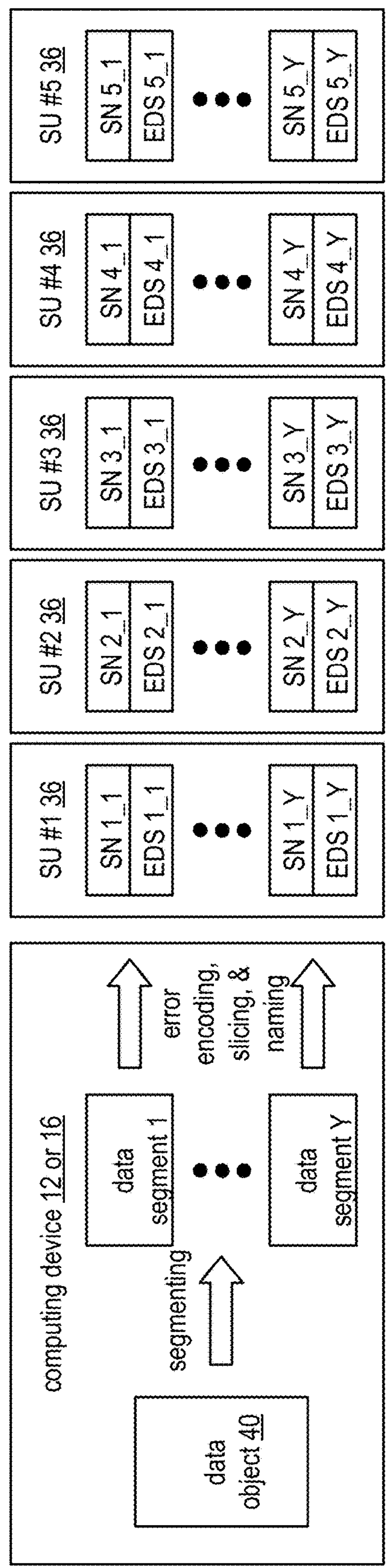
FIG. 3
SN = slice name
EDS = encoded data slice
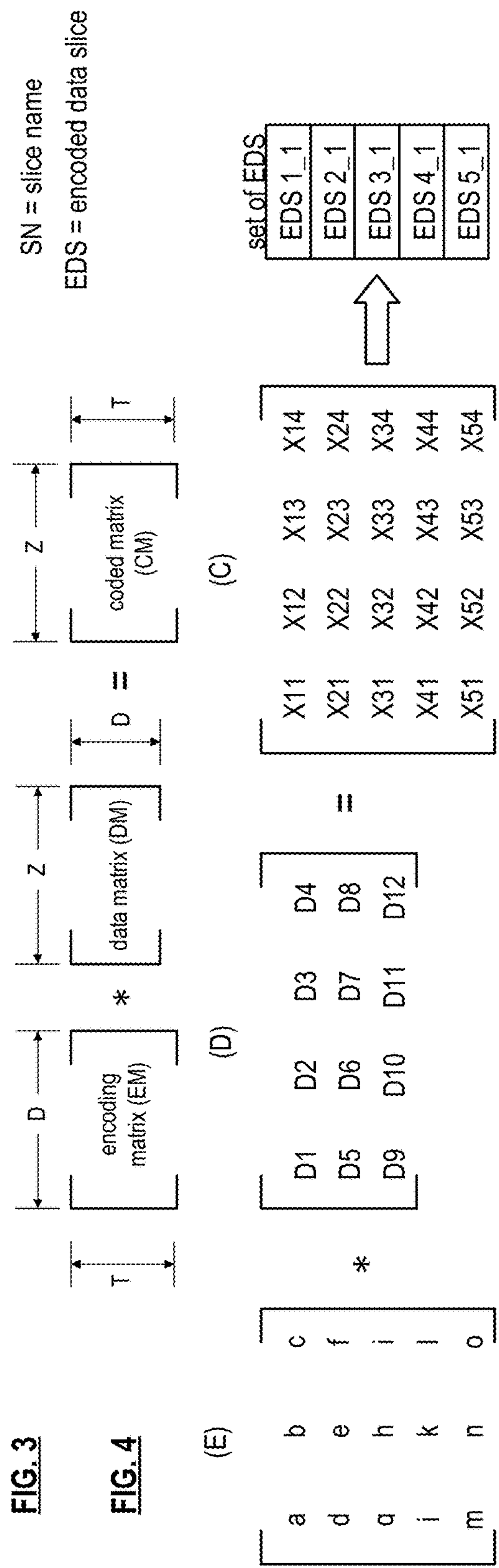
FIG. 4
FIG. 5
| slice name 80 | | | | |
|---|---|---|---|---|
| pillar # | data segment # | vault ID | data object ID | rev. info |
FIG. 6

FIG. 10A event record

| reporting entity ID | event ID | parent event ID |
|---|---|---|

| step | timestamp | sequence no. | msg source | other |
|---|---|---|---|---|
| recv request | 15:03:49.354 | 302 | user device 457 | - |
| process | 15:03:50.793 | - | - | - |
| send response | 15:03:51.485 | 302 | - | - |

FIG. 10B log record

| reporting entity ID |
|---|

| state | timestamp | state descriptor | state parameters |
|---|---|---|---|
| 1A | 15:03:49.354 | request received | slice name 2F5 |
| 2B | 15:03:50.793 | request processed | slice size 1k bytes |
| 3A | 15:03:51.485 | response sent | seq no. 302 |

FIG. 10C statistics record

| reporting entity ID |
|---|

| | | quantified descriptor 1 | | | quantified descriptor Q | |
|---|---|---|---|---|---|---|
| step | timestamp | type | value | ••• | type | value |
| recv request | 15:03:49.354 | errors | 0 | | rate | 15Mbps |
| process | 15:03:50.793 | loading | 35% | | cache | 2GB |
| send response | 15:03:51.485 | queue | 10% | | bandwidth | 10Mbps |

IDENTIFYING A PARENT EVENT ASSOCIATED WITH CHILD ERROR STATES

CROSS-REFERENCE TO RELATED APPLICATIONS

The present U.S. Utility Patent application claims priority pursuant to 35 U.S.C. § 120 as a continuation of U.S. Utility application Ser. No. 16/148,012, entitled "HIERARCHICAL EVENT TREE," filed Oct. 1, 2018, which is a continuation-in-part of U.S. Utility application Ser. No. 15/716,169, entitled "UNIFIED LOGS AND DEVICE STATISTICS" filed Sep. 26, 2017, now U.S. Pat. No. 10,678,619 on Jun. 9, 2020, which is a continuation-in-part of U.S. Utility patent application Ser. No. 13/547,769, entitled "GENERATING DISPERSED STORAGE NETWORK EVENT RECORDS, filed Jul. 12, 2012, now U.S. Pat. No. 9,852,017 on Dec. 26, 2017, which claims priority pursuant to 35 U.S.C. § 119(e) to U.S. Provisional Application No. 61/512,122, entitled "PROCESSING EVENT INFORMATION IN A DISPERSED STORAGE NETWORK," filed Jul. 27, 2011, all of which are hereby incorporated herein by reference in their entirety and made part of the present U.S. Utility Patent Application for all purposes.

BACKGROUND

Technical Field

The technical field is related generally to computer networks, and more particularly to linking child events associated with an error state to a parent event.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Some systems, maintain records regarding various system events, for example error logs, access logs, or the like. Reports generated by the system can include information about logged errors, or the results of various access events. However, logs of individual events may require extensive analysis before yielding information useful in identifying underlying causes of system performance issues.

BRIEF DESCRIPTION OF THE DRAWINGS

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of a slice name of an encoded data slice (EDS) in accordance with the present disclosure;

FIG. 10A is a diagram illustrating an example of an event record in accordance with the present disclosure;

FIG. 10B is a diagram illustrating an example of a log record in accordance with the present disclosure;

FIG. 10C is a diagram illustrating an example of a statistics record in accordance with the present disclosure;

DETAILED DESCRIPTION

Figure 1:
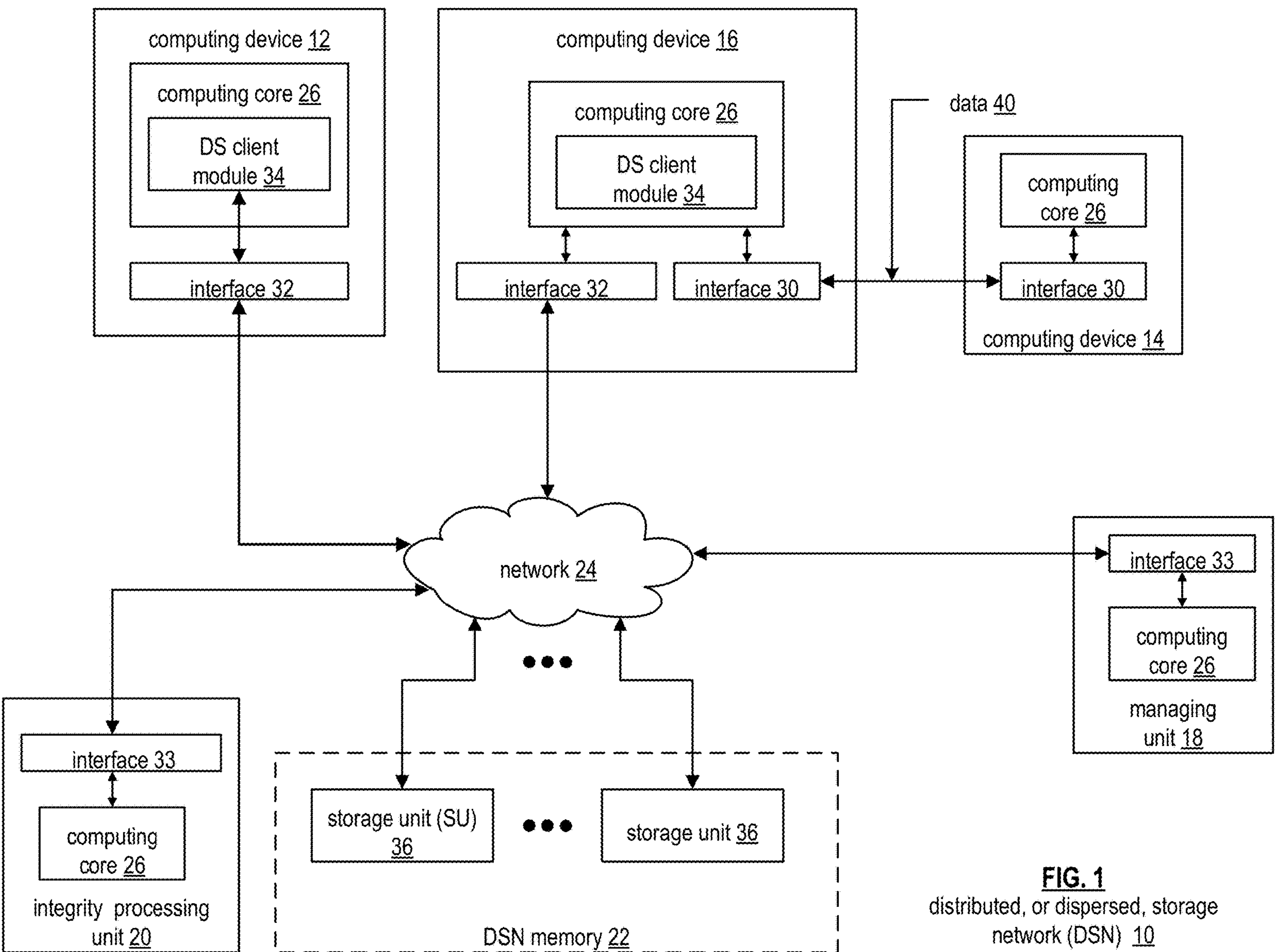
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
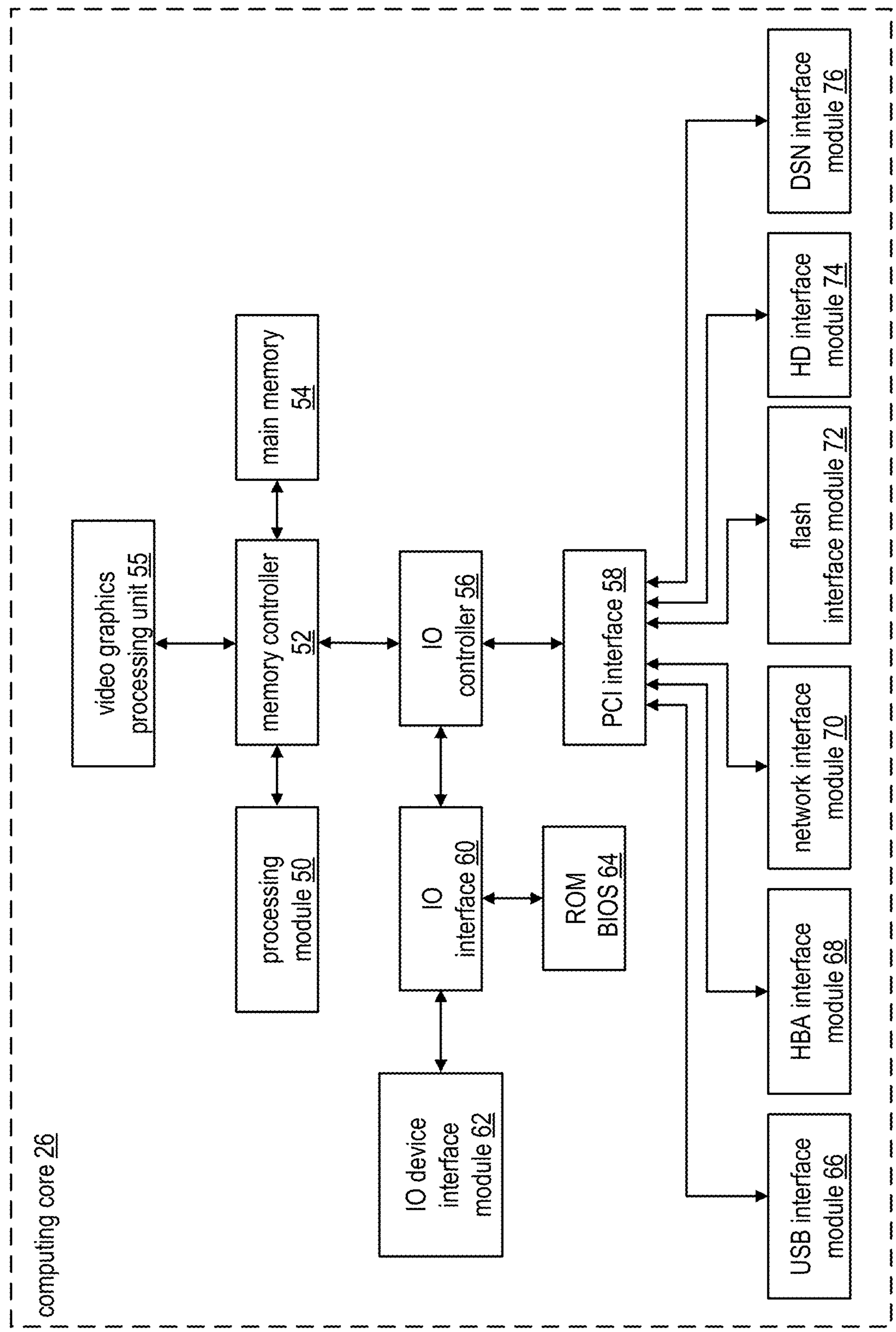
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

Computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
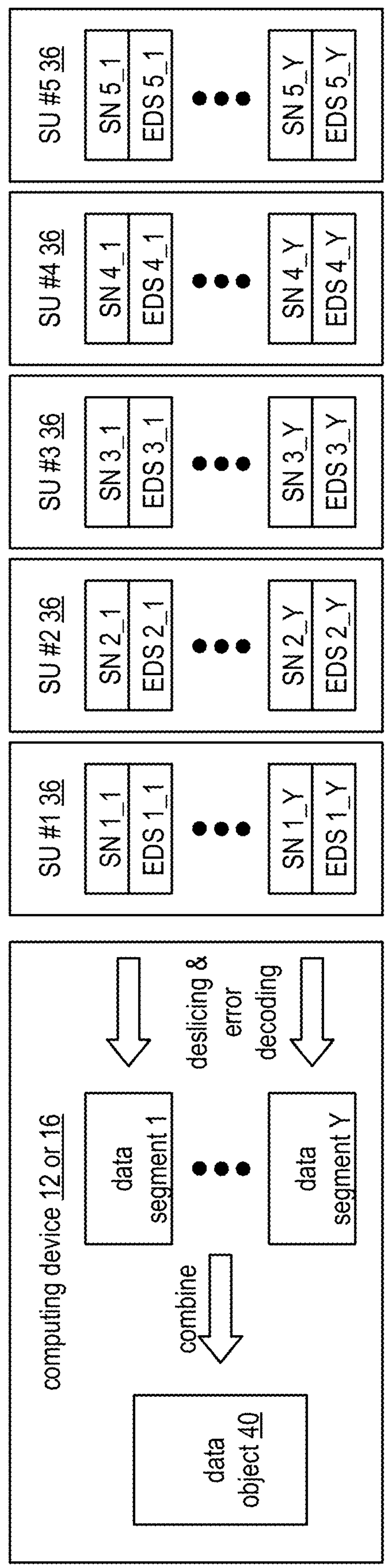
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
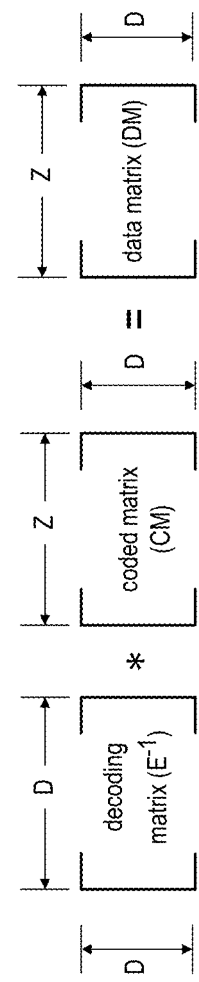
FIG. 8 is a schematic block diagram of a generic example of an error decoding function in accordance with the present disclosure.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIGS. 9-12 illustrate various embodiments employing a hierarchical event tree. The semantics of events often follow a hierarchical structure, where a first event can trigger one or more second events, which can in turn trigger one or more third events, and so on. For example, a "block write" event may trigger 16 "slice write" events, which in turn trigger 16 network messages, and responses/error conditions. When generating a distributed storage network (DSN) event, the parent/child relationship between events is captured and stored, thereby preserving information that can be used to link various events. A query process then follows the set of child relationships for the event being analyzed, in order to produce the full hierarchy of sub-events produced by the event in question.

Figure 9:
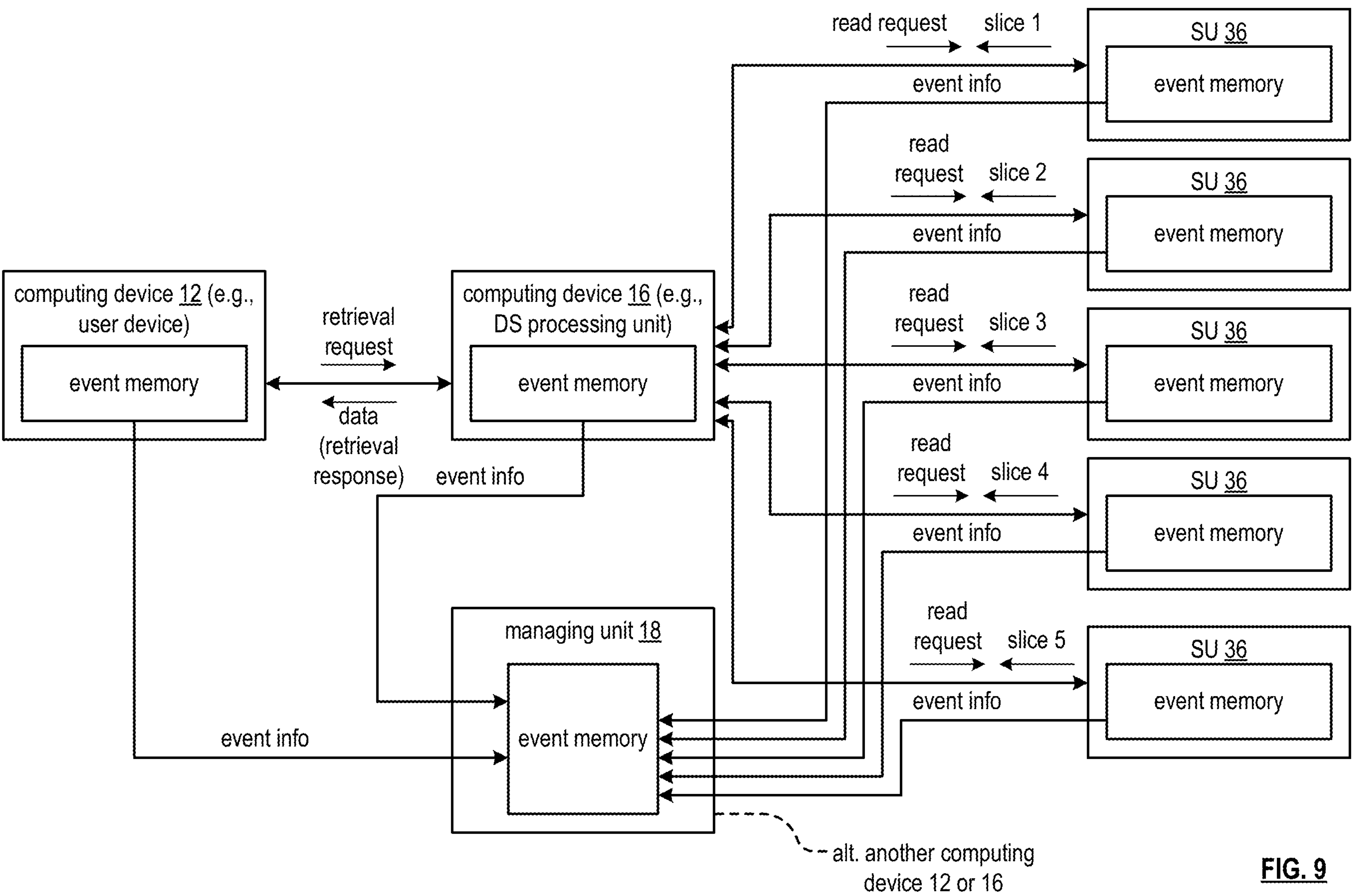
FIG. 9 is a schematic block diagram of another embodiment of a computing system in accordance with the present disclosure.

FIG. 9 is a schematic block diagram of another embodiment of a computing system in accordance with the disclosure. This diagram is a schematic block diagram of another embodiment of a computing system that includes a computing device 12 (e.g., a user device), a computing device 16 (e.g., a dispersed storage (DS) processing unit), a managing unit 18, and a plurality of storage units (SUs) 36. Each of the computing device 12, the computing device 16, the managing unit 18, and the plurality of SUs 36 may include an event memory. The event memory may be implemented as a single memory device, a plurality of memory devices, and/or embedded circuitry of a processing module. Such a memory device may be a read-only memory, random access memory, volatile memory, non-volatile memory, static memory, dynamic memory, flash memory, cache memory, magnetic disk memory, optical disk memory, and/or any device that stores digital information. The event memory stores event information including event records, log records, and statistics records.

Each of the user computing device 12, the computing device 16, the managing unit 18, and the plurality of SUs 36 store and/or retrieve event information from any one or more of the event memories of the system. Such event information may be subsequently utilized to document operation of the computing system. Any element of the system may receive event information from other elements of the system, aggregate the received event information, analyze the aggregated event information, and produce an analysis. For example, the computing device 12, the computing device 16, and the plurality of SUs 36 process transactions of the computing system, generate event information, store the event information in an associated event memory, and send the event information to the managing unit 18 for aggregation and analysis. The event records, log records, and statistics records are discussed in greater detail with reference to FIGS. 10A-10C.

In an example of operation, computing device 12 sends a retrieval request to the computing device 16, generates retrieval request event information, and stores the retrieval request event information in the event memory of the computing device 12. The computing device 16 receives the retrieval request, generates received retrieval request event information, and stores the received retrieval request event information in the event memory of the computing device 16. The computing device 16 processes the retrieval request to generate a plurality of read requests, generates read request processing event information (e.g., for each request), and stores the read request processing event information in the event memory of the computing device 16. The computing device 16 sends the plurality of read requests to the plurality of SUs 36, generates read request sending event information (e.g., for each request), and stores the read request sending event information in the event memory of the computing device 16. Each SU 36 of the plurality of SUs 36 receives a read request of the plurality of read requests, generates received read request event information, and stores the received read request event information in the event memory of the SU 36. The SU 36 processes the read request to retrieve a slice, generates slice retrieval processing event information, and stores the slice retrieval processing event information in the event memory of the SU 36. The SU 36 sends a read response that includes the retrieved slice to computing device 16, generates read response event information, and stores the read response event information in the event memory of the SU 36.

In the example of operation continued, the computing device 16 receives a read response from each SU 36 of the plurality of SUs 36 to produce a plurality of slices 1-5. The computing device 16 generates received read response event information corresponding to each of the received slices 1-5 and stores the read response event information in the event memory of the computing device 16. The computing device 16 processes the received slices 1-5 decoding the slices 1-5 to reproduce data. The computing device 16 generates decoding event information and stores the decoding event information in the event memory of the computing device 16. The computing device 16 sends a retrieval response that includes the data to the computing device 12, generates retrieval response event information, and stores the retrieval response event information in the event memory of the computing device 16. The computing device 12 receives the retrieval response, generates received data event information, and stores the received data event information in the event memory.

In the example of operation continued, each of the computing device 12, the computing device 16, and the plurality of SUs 36 send event information to the managing unit 18. The managing unit 18 stores event information in the event memory of the managing unit 18. The managing unit 18 receives an analysis query from a requesting entity, retrieves event information from the event memory of managing unit 18, aggregates the event information, analyzes the event information in accordance with the analysis query to produce an analysis, generates a representation of the analysis, and sends the representation to the requesting entity.

In an example of operation and implementation, a computing device (e.g., computing device 12, computing device 16, managing unit 18, a SU 36 of the set of SUs, etc.) includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations. The processing module, when operable within the computing device based on the operational instructions, is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, the computing device is configured to detect a state change within the DSN based on at least one signal received via the interface. Note that a data object is segmented into a plurality of data segments, and a data segment of the plurality of data segments is dispersed error encoded in accordance with dispersed error encoding parameters to produce a set of encoded data slices (EDSs) that are distributedly stored in a plurality of SUs within the DSN. The computing device is also configured to obtain a state descriptor and to obtain a timestamp. The computing device is also configured to obtain state parameters. Then, the computing device is also configured to generate a log record entry based on aggregation of the state change, the state descriptor, the timestamp, and/or the state parameters. The computing device is also configured to facilitate storage of the log record entry within event memory of the DSN.

In some examples, note that the detection of the state change is based on a software flag, a message, a predetermination, a process output, a pattern match, a valid state table, and/or a previous state condition. In some other examples, the obtaining the state descriptor is based on the state change, lookup, generating a state descriptor, a state descriptor table lookup, retrieving the state descriptor, and/or receiving the state descriptor in response to sending a query. In even other examples, the obtaining the timestamp is based on querying a time module, receiving the timestamp, and/or retrieving the timestamp. In some other examples, obtaining the state parameters is based on the state change, the state descriptor, the timestamp, a state parameters table lookup, retrieving state parameters, an error message, a parameter table lookup, a parameter history record lookup, and/or receiving a state parameter in response to sending the query or another query. Also, in some particular examples, facilitating the storage of the log record entry within event memory of the DSN is based on storing the log record entry within locally within the memory and/or transmitting the log record entry to another computing device within the DSN.

In some examples of operation and implementation, the computing device is also configured to determine to generate a statistics record. The computing device is also configured to obtain one or more quantitative descriptor types and obtain a quantitative descriptor value for each of the one or more quantitative descriptor types. The computing device is also configured to obtain the timestamp described above (and/or another timestamp) and to generate a statistics record entry. In some examples, the computing device is configured to generate a statistics record entry including to generate one or more entries of fields of the statistics record entry including a reporting entity identifier (ID), a step of a process and/or event, the timestamp(s), the one or more quantitative descriptor types, and/or one or more quantitative descriptor values corresponding to each of the one more quantitative descriptor types. Then, the computing device is also configured to facilitate storage of the statistics record entry within event memory of the DSN.

In some particular examples, determination to generate the statistics record is based on an error message, a state change, a time period, an event, a software flag, a message, a predetermination, a process output, a pattern match, a previous state condition, a previous statistic, a statistical correlation output, a request, or receipt of a slice storage error message. Also, in other examples, obtaining the one or more descriptor types is based a lookup, a system condition, configuration information, a retrieval, a query, receiving, an error message, and/or a memory utilization indicator. Note also that, in certain other examples, obtaining the quantitative descriptor value for each of the one or more quantitative descriptor types is based on query, receiving, an error message, a historical record lookup, another statistics record entry, and/or a value source indicator table lookup.

In some examples, with respect to a data object, the data object is segmented into a plurality of data segments, and a data segment of the plurality of data segments is dispersed error encoded in accordance with dispersed error encoding parameters to produce a set of encoded data slices (EDSs). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of ED Ss from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other computing device, at least one SU of a plurality of SUs within the DSN (e.g., such as a plurality of SUs that are implemented to store distributedly the set of EDSs), etc. In addition, note that such a computing device as described herein may be implemented as any of a number of different devices including a managing unit that is remotely located from another computing device within the DSN and/or SU within the DSN, an integrity processing unit that is remotely located from another computing device and/or SU within the DSN, and/or other device. Also, note that such a computing device as described herein may be of any of a variety of types of devices as described herein and/or their equivalents including a SU including a SU of any group and/or set of SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

FIG. 10A is a diagram illustrating an example of an event record in accordance with the disclosure. This is a diagram illustrating an example of an event record that includes a reporting entity identifier (ID) field, an event ID field, a parent event ID field, and a table including a step field, a timestamp field, a sequence number field, a message source field, and another field. Such an event record may be associated with an event record ID. The reporting entity ID field includes a reporting entity ID entry signifying an entity generating the event record. For example, reporting entity ID field includes an entry of ID=2 when the reporting entity is SU 2. The event ID field includes an event ID entry signifying an ID of a common event subsequently utilized to correlate event information from two or more reporting entities. For example, SU 2 and user device 3 create an event record utilizing event ID=54 when SU 2 and user device 3 perform steps associated with a common transaction. The parent event ID field includes a parent event ID entry signifying an ID of an event that initialized the present event. For example, SU 4 receives a read request of event ID=20 and spawns a new event ID=21 to authenticate the read request. The SU 4 generates an event record for event ID=21 that includes a parent event ID=20. Newly spawned events may spawn even more children events resulting in multiple layers of events. Multiple layers of events are discussed in greater detail with reference to FIG. 11.

The step field includes a step entry describing a step of the event. For example, a received request step, a processing step, a send response step, an authentication step, etc. The timestamp field includes a timestamp entry associated with the step. The sequence number field includes a sequence number entry of a protocol message between two or more elements of the computing system. The message source field includes a message source entry identifier of a system element sending an associated message. The other field includes another entry for additional information associated with the step. Such another entry includes one or more of a slice name, a source name, a transaction number, a system element hardware ID, a software version number, a software pointer, a log record ID, and a statistics record ID.

FIG. 10B is a diagram illustrating an example of a log record in accordance with the disclosure. This is a diagram illustrating an example of a log record that includes a reporting entity identifier (ID) field and a table including a state field, a timestamp field, a state descriptor field, and a state parameters field. Such a log record may be associated with a log record ID. The state field includes a state entry signifying a state of one or more of a software process, an event, a system state, a transaction, and a sequence. The state descriptor field includes a state descriptor entry qualitatively describing an associated state. For example, request received, request process, response sent, authentication request, authentication approved, memory available, system error, etc. The state parameters field includes a state parameter entry signifying additional information associated with the associated state. For example, a slice name, a slice size indicator, a sequence number, a transaction number, a software line, a software breakpoint indicator, a message ID, a requester Internet protocol address, etc.

FIG. 10C is a diagram illustrating an example of a statistics record in accordance with the disclosure. This is a diagram illustrating an example of a statistics record that includes a reporting entity identifier (ID) field and a table including a step field, a timestamp field, and one or more quantified descriptor fields 1-Q. Each quantified descriptor field includes a type field and a value field. Such a statistics record may be associated with a statistics record ID. The type field includes a type entry describing an associate value type. For example, a number of errors, a loading factor, a bandwidth utilization factor, a memory utilization factor, a reliability indicator, and availability indicator, a queue depth indicator, a bandwidth indicator, a cache availability indicator, a data rate indicator, etc. The value field includes a quantitative value entry of the associated type of quantified descriptor.

Figure 11:
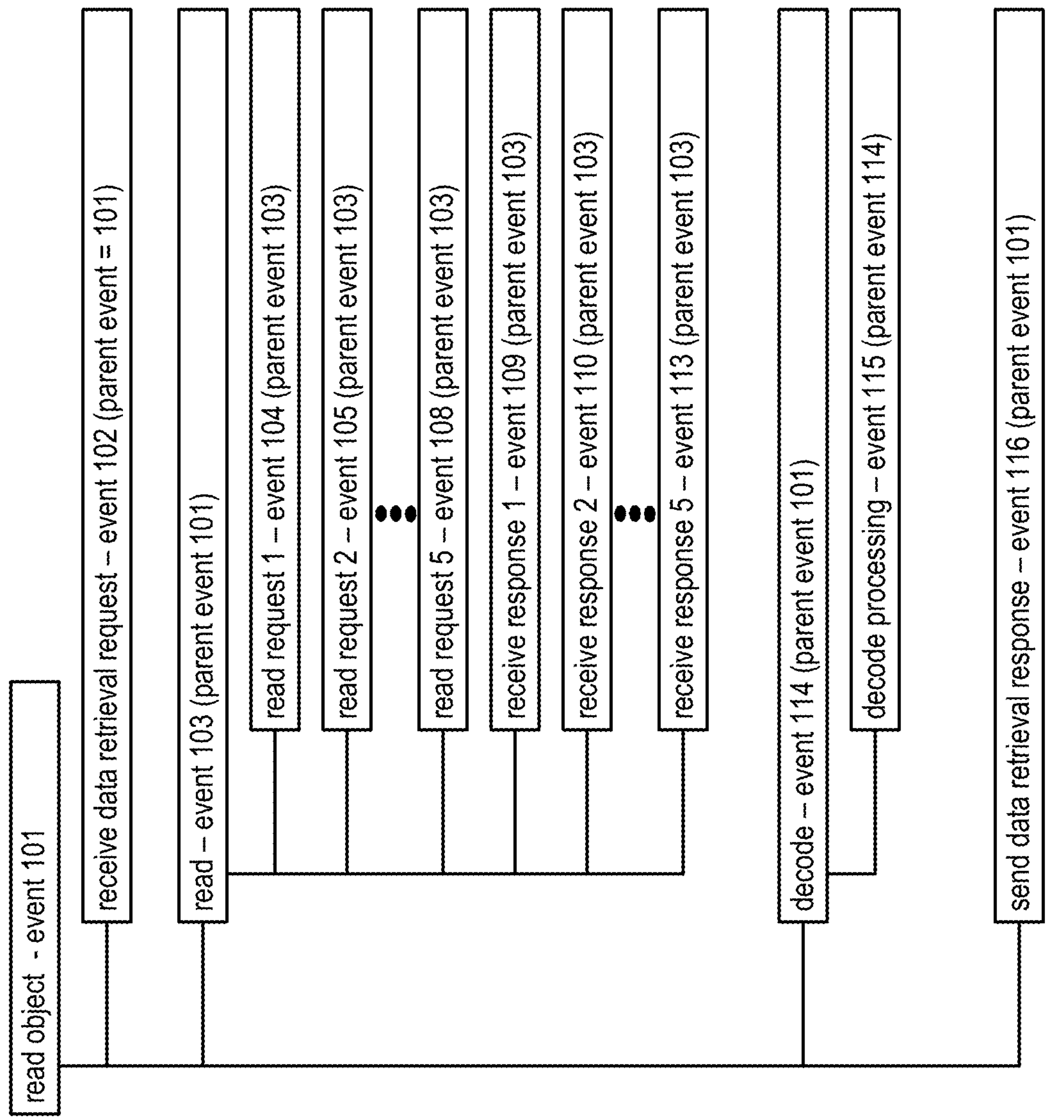
FIG. 11 is a diagram illustrating an example of a hierarchal event record representation in accordance with the present disclosure.

FIG. 11 is a diagram illustrating an example of a hierarchal event record representation in accordance with the disclosure. This is a diagram illustrating an example of a hierarchal event record representation that includes a time sequential representation of an event. The time sequential representation includes one or more children events associated with the event. A child event of the one or more children events associated with the event is one layer removed from the event and is represented by one indentation from the event towards the right. A child event may include one or more children events (e.g., grandchildren) associated with the child event. A grandchild event of the child event is two layers removed from the event and is represented by two indentations from the event towards the right. A still further child event may be at any layer removed from the event.

The representation may include a plurality of event information records (e.g., one or more of an event record, a log record, and a statistics record), wherein each event record includes at least an event identifier (ID) and a parent event ID when the event ID of the event record is associated with a child event. For example, a read object event associated with a dispersed storage (DS) processing unit is assigned event ID=101 and is associated with a plurality of children events including a received data retrieval request event ID=102, a read event ID=103, a decode event ID=114, and a send data retrieval response event ID=116. Each child event of the probably of children events is associated with parent event ID=101.

Children events may include children events. For example, the read event ID=103 includes read request 1-5 children events IDs=104-108 and read response 1-5 events IDs 109-113 when a response is received from five SUs. As another example, the read event ID=103 includes read request 1-5 children events IDs=104-108 and read response 1-3 events IDs 109-111 when a response is received from three of five SUs. A subsequent analysis of the representation indicates that two slices were not received when the received response event includes read responses 1-3 (e.g., missing responses 4-5). As another child of child event example, the decode event ID=114 includes a decode processing event ID=115. The read object event 101 finishes with the same data retrieval response event ID=116.

Figure 12:
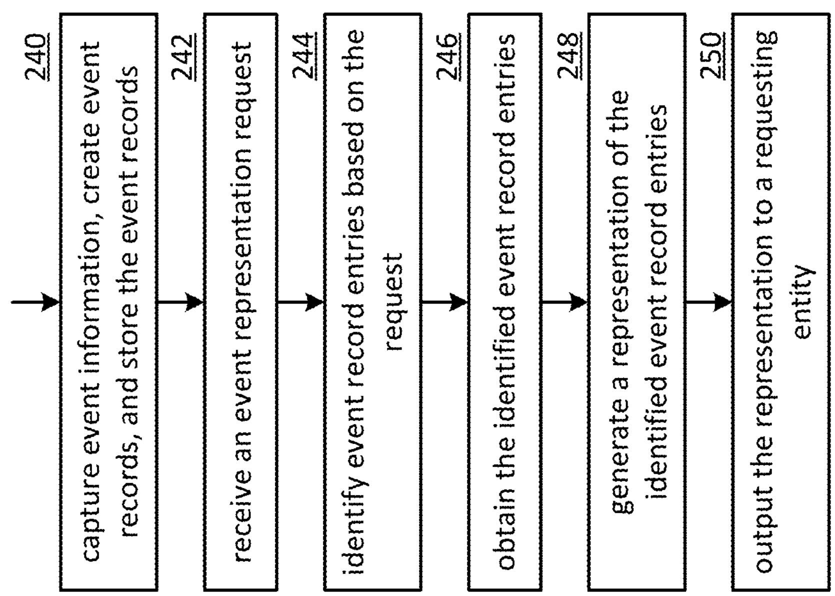
FIG. 12 is a flowchart illustrating an example of generating a representation of event records in accordance with the present disclosure

FIG. 12 is a flowchart illustrating an example of generating a representation of event records. The method begins at step 240 where a processing module (e.g., of a dispersed storage (DS) managing unit) captures event information, creates event records, and stores the event records as previously described. The method continues at step 242 where the processing module receives an event representation request (e.g., from a user device, from another DS managing unit, from an error correlation process). The representation request includes one or more query filters, wherein a query filter of the query filters includes one or more of a request type, a level indicator, a reporting entity identifier (ID), an event ID, a parent event ID, and a child event ID.

The method continues at step 244 where the processing module identifies event record entries based on the representation request. The identification includes searching event record entries by comparing a query filter to an event record entry to identify favorable comparisons. The method continues at step 246 where the processing module obtains the identified event record entries. The obtaining includes retrieving the identified event record entries from one or more reporting entities storing event records. For example, the processing module determines to obtain the identified event record entries from a set of DS units and sends an event record entry retrieval request to each DS unit of a set of DS units. Next, the processing module receives retrieval responses from each DS unit of a set of DS units that includes the identified event record entries. The method continues at step 248 where the processing module generates a representation of the identified event record entries. The generation includes at least one of sorting by time, sorting by event ID, sorting by parent/child relationship, sorting by event level, displaying in a hierarchical view of parent events and child events (e.g., as described with reference to FIG. 11). The method continues at step 250 where the processing module outputs a representation to a requesting entity.

Figure 13:
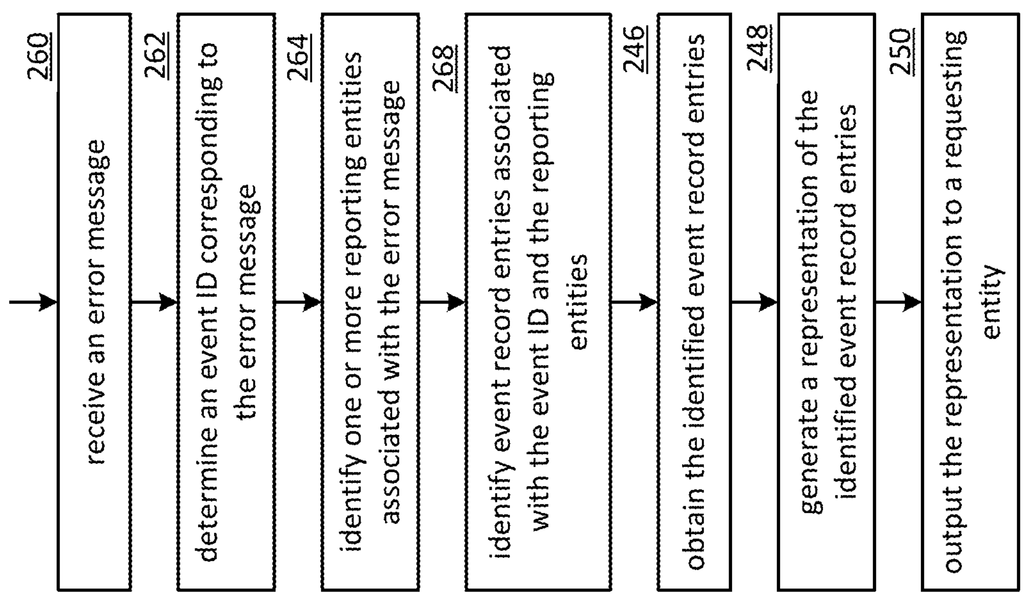
FIG. 13 is example of analyzing event records in accordance with the disclosure.

FIG. 13 is a flowchart illustrating an example of analyzing event records, which includes similar steps to FIG. 12. The method begins at step 260 where a processing module (e.g., of a dispersed storage (DS) managing unit) receives an error message. The error message includes at least one of an object identifier (ID), a data ID, a reporting entity ID, a timestamp, an error type indicator, and an event ID. The receiving includes at least one of receiving an unsolicited error message, receiving the error message in response to inquiry, and retrieving the error message from an error message list.

The method continues at step 262 where the processing module determines an event ID corresponding to the error message. The determination may be based on one or more of the error message, receiving the event ID, a query, and an event record lookup. The method continues at step 264 where the processing module identifies one or more reporting entities associated with the error message. The identification includes at least one of receiving a reporting entity ID in the error message, performing an event record lookup based on event ID, and receiving the reporting entity ID in response to a query.

The method continues at step 268 where the processing module identifies event record entries associated with event ID and reporting entities. The identification includes at least one of receiving a message, performing an event record search based on the event ID, and performing an event record search based on identifiers of the reporting entities. For example, the processing module sends a request for event records associated with reporting entity ID=304 to DS unit 1, receives an event record from DS unit 1, and identifies a corresponding event record entry of event record associated with reporting entity ID=304 and an event record ID=400. The method continues with steps 246, 248, and 250 of FIG. 12 where the processing module obtains the identified event record entries, generates a representation of the identified event record entries, and outputs the representation to a requesting entity.

Figure 14:
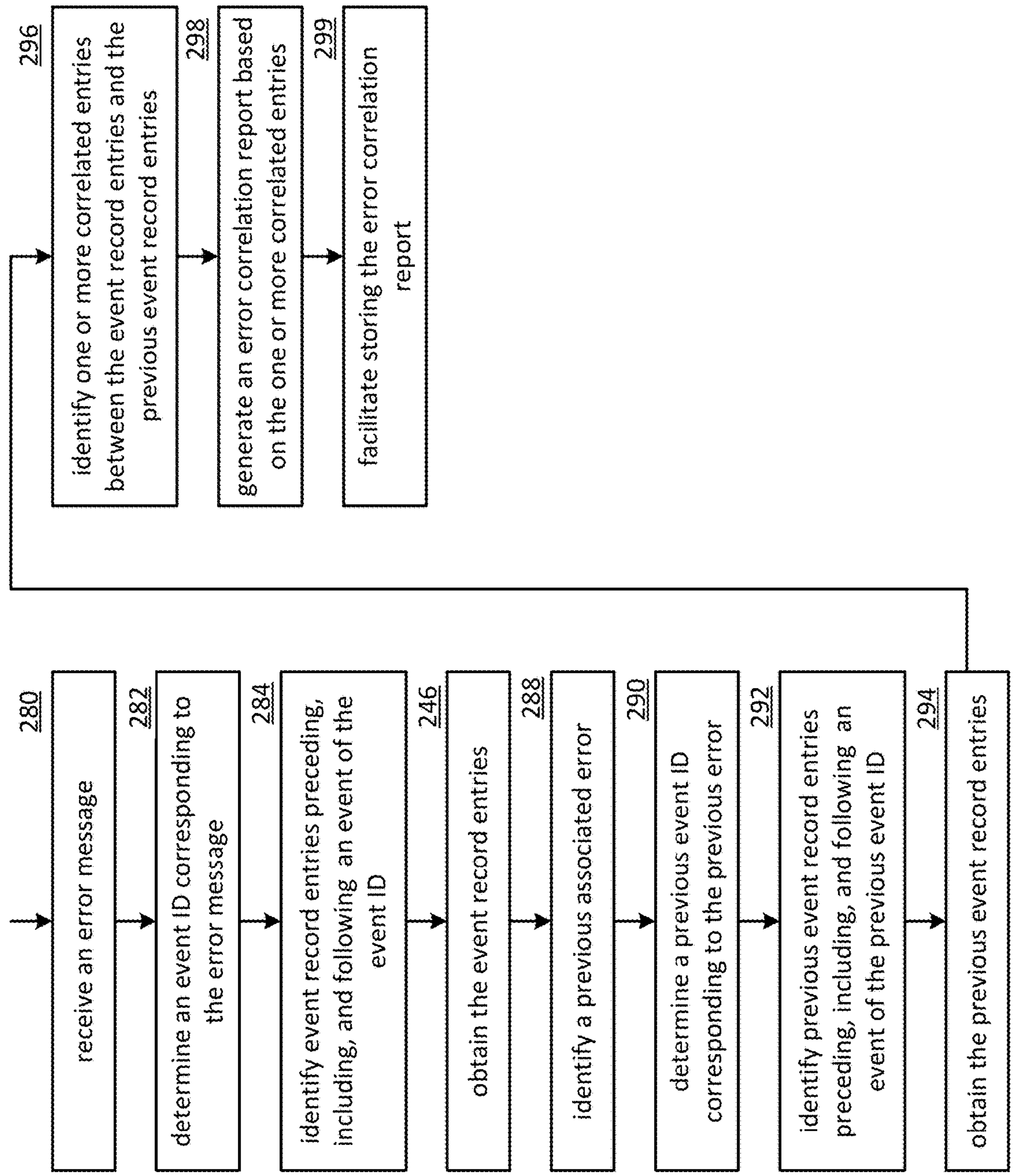
FIG. 14 is a flowchart illustrating an example of correlating errors in accordance with the disclosure.

FIG. 14 is a flowchart illustrating an example of correlating errors, which include similar steps to FIGS. 12 and 13. The method begins with steps 260 and 262 of FIG. 15, where a processing module (e.g., of a dispersed storage (DS) managing unit) receives an error message and determines an event identifier (ID) corresponding to the error message. The method continues at step 284 where the processing module identifies event record entries preceding, including, and following an event of the event ID. The identifying may be based on at least one of a timestamp associated with event ID and event record entries associated with a timestamp within a predetermined time before and after the timestamp. For example, the processing module identifies event record entries that are time stamped within 60 minutes of the event ID when the predetermined time is 60 minutes. The method continues at step 246 of FIG. 12 where the processing module obtains the event record entries.

The method continues at step 288 where the processing module identifies a previous associated error. The identification maybe based on one or more of the error message and the identified event record entries. The previous associated error includes at least one of a previous error that is substantially same as an error of the error message and a previous error that is related to (e.g., same error family, same reporting entity IDs, typically present with the error) the error of the error message. The method continues at step 290, which is similar to step 262 of FIG. 13 where the processing module determines a previous event ID corresponding to the previous error. The method continues at step 292, where the processing module identifies previous event record entries preceding, including, and following an event of the previous event ID. The method continues at step 294, which is similar to step 246 of FIG. 12 where the processing module obtains the previous event record entries.

The method continues at step 296 where the processing module identifies one or more correlated entries between the event record entries and the previous event record entries. The identifying includes comparing entries to identify a favorable correlation trend. For example, the processing module compares entries to identify an event that always precedes the error. The method continues at step 298 where the processing module generates an error correlation report based on the one or more correlated entries. The generation includes identifying and aggregating report elements including one or more of the error message, the one or more correlated entries, the event ID, the previous associated error, the previous event ID, and a timestamp. The method continues at step 299, where the processing module facilitates storing the error correlation report. The facilitation includes at least one of storing the error correlation report in a local memory and sending the error correlation report to another system entity.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or may further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:

receiving, at a managing unit, event records from a plurality of computing devices, wherein individual event records include:

an event identifier field including an event identifier identifying a first event associated with a particular computing device;

a parent event identifier field including a parent event identifier identifying a parent event that initialized the first event;

an entity identifier field including an entity identifier identifying the particular computing device;

generating, at the managing unit, log records associated with event identifiers included in the event records from the plurality of computing devices, wherein the log records include state fields with entries indicating a state of a particular event associated with a particular event identifier;

determining, at the managing unit, based on a correlation of the event records and the log records, that at least two computing devices are associated with first events associated with an error state;

identifying, at the managing unit, parent events that initialized the first events associated with the error state; and generating, at the managing unit, a report linking the parent events to the first events associated with the error state.

2. The method of claim 1, wherein determining that at least two computing devices are associated with first events associated with an error state includes:

determining that a first event identifier included in a first event identification field that is part of a first event record generated by a first computing device matches a second event identifier included in a second event identification field that is part of a second event record generated by a second computing device.

3. The method of claim 2, wherein determining that at least two computing devices are associated with first events associated with an error state includes:

determining that a first state field included in a first log record generated by the first computing device indicates that an event associated with both the first event identifier and the second event identifier is associated with an error state.

4. The method of claim 1, wherein generating the report includes:

generating a hierarchal event record including a time-sequential representation of a particular parent event that initialized a particular first event associated with the error state.

5. The method of claim 4, further comprising:

generating a display including a sequential representation including one or more child events associated with the parent event.

6. The method of claim 1, wherein:

a parent event includes a read event; and the first events include read requests generated in response to the read event.

7. The method of claim 1, wherein:

a parent event includes a decode event; and the first events include decode processing events initiated in response to the decode event.

8. A processing device configured to implement a distributed storage managing unit, the processing unit comprising:

a processor;

memory coupled to the processor, the memory including a program of instructions configured to implement a method, including:

receiving event records from a plurality of computing devices, wherein individual event records include:

an event identifier field including an event identifier identifying a first event associated with a particular computing device;

a parent event identifier field including a parent event identifier identifying a parent event that initialized the first event;

an entity identifier field including an entity identifier identifying the particular computing device;

generating log records associated with event identifiers included in the event records from the plurality of computing devices, wherein the log records include state fields with entries indicating a state of a particular event associated with a particular event identifier;

determining, based on a correlation of the event records and the log records, that at least two computing devices are associated with first events associated with an error state;

identifying parent events that initialized the first events associated with the error state; and generating a report linking the parent events to the first events associated with the error state.

9. The processing device of claim 8, wherein determining that at least two computing devices are associated with first events associated with an error state includes:

determining that a first event identifier included in a first event identification field that is part of a first event record generated by a first computing device matches a second event identifier included in a second event identification field that is part of a second event record generated by a second computing device.

10. The processing device of claim 9, wherein determining that at least two computing devices are associated with first events associated with an error state includes:

determining that a first state field included in a first log record generated by the first computing device indicates that an event associated with both the first event identifier and the second event identifier is associated with an error state.

11. The processing device of claim 8, wherein generating the report includes:

generating a hierarchal event record including a time-sequential representation of a particular parent event that initialized a particular first event associated with the error state.

12. The processing device of claim 11, further comprising:

generating a display including a sequential representation including one or more child events associated with the parent event.

13. The processing device of claim 8, wherein:

a parent event includes a read event; and the first events include read requests generated in response to the read event.

14. The processing device of claim 8, wherein:

a parent event includes a decode event; and the first events include decode processing events initiated in response to the decode event.

15. A non-transitory computer readable medium tangibly embodying a program of instructions configured to be executed by a processor, the program of instructions comprising:

at least one instruction to receive event records from a plurality of computing devices, wherein individual event records include:

an event identifier field including an event identifier identifying a first event associated with a particular computing device;

a parent event identifier field including a parent event identifier identifying a parent event that initialized the first event;

an entity identifier field including an entity identifier identifying the particular computing device;

at least one instruction to generate log records associated with event identifiers included in the event records from the plurality of computing devices, wherein the log records include state fields with entries indicating a state of a particular event associated with a particular event identifier;

at least one instruction to determine, based on a correlation of the event records and the log records, that at least two computing devices are associated with first events associated with an error state;

at least one instruction to identify parent events that initialized the first events associated with the error state; and at least one instruction to generate a report linking the parent events to the first events associated with the error state.

16. The non-transitory computer readable medium of claim 15, wherein the at least one instruction to determine that at least two computing devices are associated with first events associated with an error state includes:

at least one instruction to determine that a first event identifier included in a first event identification field that is part of a first event record generated by a first computing device matches a second event identifier included in a second event identification field that is part of a second event record generated by a second computing device.

17. The non-transitory computer readable medium of claim 16, wherein the at least one instruction to determine that at least two computing devices are associated with first events associated with an error state includes:

the at least one instruction to determine that a first state field included in a first log record generated by the first computing device indicates that an event associated with both the first event identifier and the second event identifier is associated with an error state.

18. The non-transitory computer readable medium of claim 15, wherein the at least one instruction to generate the report includes:

the at least one instruction to generate a hierarchal event record including a time-sequential representation of a particular parent event that initialized a particular first event associated with the error state.

19. The non-transitory computer readable medium of claim 18, further comprising:

the at least one instruction to generate a display including a sequential representation including one or more child events associated with the parent event.

20. The non-transitory computer readable medium of claim 15, wherein:

a parent event includes a read event; and the first events include read requests generated in response to the read event.

* * * * *